US009348832B2

(12) United States Patent
Thing

(10) Patent No.: US 9,348,832 B2
(45) Date of Patent: May 24, 2016

(54) METHOD AND DEVICE FOR REASSEMBLING A DATA FILE

(75) Inventor: Ling Ling Vrizlynn Thing, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 255 days.

(21) Appl. No.: 13/818,458

(22) PCT Filed: Aug. 24, 2011

(86) PCT No.: PCT/SG2011/000291
§ 371 (c)(1),
(2), (4) Date: May 8, 2013

(87) PCT Pub. No.: WO2012/026884
PCT Pub. Date: Mar. 1, 2012

(65) Prior Publication Data
US 2013/0226923 A1    Aug. 29, 2013

Related U.S. Application Data

(60) Provisional application No. 61/376,698, filed on Aug. 25, 2010.

(51) Int. Cl.
*G06F 17/30* (2006.01)
*G06F 7/00* (2006.01)

(52) U.S. Cl.
CPC .... *G06F 17/30135* (2013.01); *G06F 17/30117* (2013.01)

(58) Field of Classification Search
CPC ................................................ G06F 17/30067
See application file for complete search history.

(56) References Cited

U.S. PATENT DOCUMENTS

2007/0198606 A1*  8/2007  Memon et al. ............... 707/202
2010/0257146 A1* 10/2010  Memon et al. ............... 707/693

OTHER PUBLICATIONS

Garfinkel, Carving Contiguous and Fragmented Files with Fast Object Validation, 4S Digital Investigation S2 (2007).
Menard, et al., On Finding Archaeological Fragment Assemblies Using a Bottom-Up Design, Pattern Recognition and Image Processing Group 203 (1997).

(Continued)

*Primary Examiner* — Sangwoo Ahn
(74) *Attorney, Agent, or Firm* — K. David Crockett, Esq.; Niky Economy Syrengelas, Esq.; Crockett & Crockett, PC

(57) ABSTRACT

Embodiments provide a method for reassembling a data file from a starting file fragment and a plurality of file fragments stored on a digital storage device. The method includes determining, from the plurality of file fragments, one or more matched file fragments which match the starting file fragment based on a first predetermined criterion; associating the one or more matched file fragments with the starting file fragment; and determining one or more candidate data files based on the one or more matched file fragments. The method further includes checking if more than one file fragments have been determined to match the starting file fragment based on the first predetermined criterion. If more than one matched file fragments have been determined to match the starting file fragment based on the first predetermined criterion, the method further includes selecting a candidate data file from the candidate data files determined for the matched file fragments as the reassembled data file based on a second predetermined criterion.

12 Claims, 19 Drawing Sheets

(56) References Cited

OTHER PUBLICATIONS

Kampel, et al., Classification of Archaeological Fragments Using Profile Primitives, Pattern Recognition and Image Processing Group 151 (2001).

Stemmer, DNA Shuffling by Random Fragmentation and Reassembly: In Vitro Recombination for Molecular Evolution, 91 Proc. Natl. Acad. Sci. USA 10747 (1994).

Leitão, et al., A Multiscale Method for the Reassembly of Two-Dimensional Fragmented Objects, 24 IEEE Transactions on Pattern Analysis and Machine Intelligence 1239 (IEEE 2002).

Leitão, et al., Automatic Reassembly of Irregular Fragments, Univ. of Campinas, Tech. Rep. 1 (1998).

Pal, et al., Detecting File Fragmentation Point Using Sequential Hypothesis Testing, 5 Digital Investigation S2 (2008).

Memon, et al., Automated Reassembly of File Fragmented Images Using Greedy Algorithms, IEEE Transactions on Image Processing 1 (IEEE 2006).

Pal, et al., Automated Reassembly of Fragmented Images, Presented at ICASSP (2003).

Shanmugasundaram, et al., Automatic Reassembly of Document Fragments via Context Based Statistical Models, Proceedings of the 19th Annual Computer Security Applications Conference 152 (2003).

Shanmugasundaram, et al., Automatic Reassembly of Document Fragments via Data Compression, 2nd Digital Forensics Research Workshop 1 (2002).

Ying, et al., Optimal Path Construction for Fragmented File Carving, Proceedings of the South African Information Security Multi-Conference 248 (2010).

Ying, et al., A Novel Inequality-Based Fragmented File Carving Technique, International ICST Conference on Forensic Applications and Techniques in Telecommunication, Information and Multimedia, e-Forensics (2010).

Martucci, Reversible Compression of HDTV Images Using Median Adaptive Prediction and Arithmetic Coding, IEEE International Symposium on Circuits and Systems 1310 (IEEE 1990).

Cohen, Advanced Jpeg Carving, 16 Proceedings of the 1st International Conference on Forensic Applications and Techniques in Telecommunications, Information, and Multimedia and Workshop (2008).

Cohen, Advanced Carving Techniques, Digital Investigation 1 (2007).

* cited by examiner

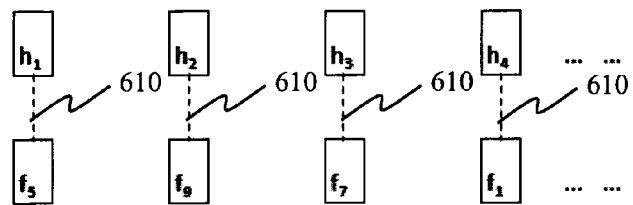
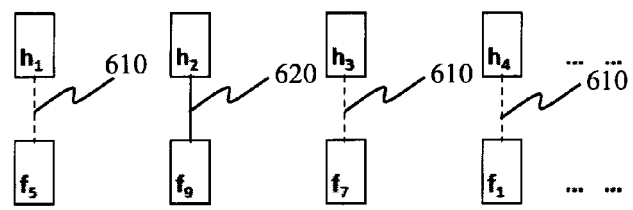
Fig. 6
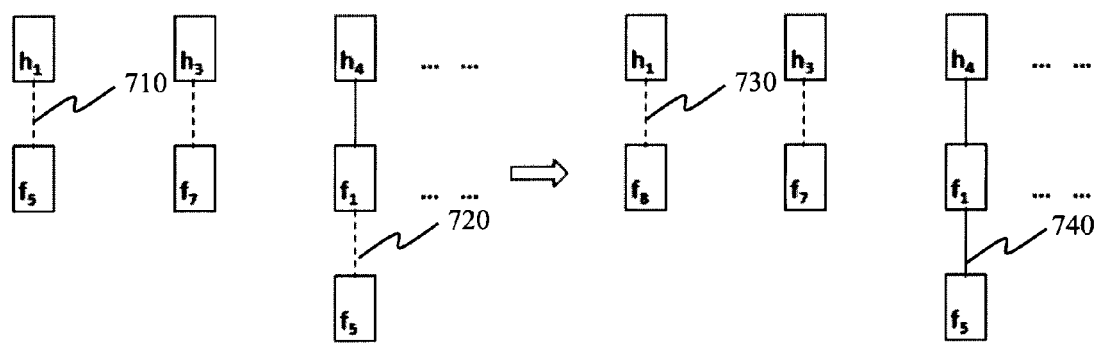
Fig. 7

```
Destination ID = 0 (Luminance)
Class = 0 (DC / Lossless Table)
Expanded Form of Codes:
  Codes of length 02 bits:
    00 = 00 (EOB)
  Codes of length 03 bits:
    010 = 01
    011 = 02
    100 = 03
    101 = 04
    110 = 05
  Codes of length 04 bits:
    1110 = 06
  Codes of length 05 bits:
    11110 = 07
  Codes of length 06 bits:
    111110 = 08
  Codes of length 07 bits:
    1111110 = 09
  Codes of length 08 bits:
    11111110 = 0A
  Codes of length 09 bits:
    111111110 = 0B
```

```
Destination ID = 0 (Luminance)
Class = 1 (AC Table)
Expanded Form of Codes:
  Codes of length 02 bits:
    00 = 01
    01 = 02
  Codes of length 03 bits:
    100 = 03
  Codes of length 04 bits:
    1010 = 00 (EOB)
    1011 = 04
    1100 = 11
  Codes of length 05 bits:
    11010 = 05
    11011 = 12
    11100 = 21
  Codes of length 06 bits:
    111010 = 31
    111011 = 41
  Codes of length 07 bits:
    1111000 = 06
    1111001 = 13
    1111010 = 51
    1111011 = 61
  Codes of length 08 bits:
    11111000 = 07
    11111001 = 22
    11111010 = 71
  Codes of length 09 bits:
    111110110 = 14
    111110111 = 32
    111111000 = 81
    111111001 = 91
    111111010 = A1
```

```
Codes of length 10 bits:
  1111110110 = 08
  1111110111 = 23
  1111111000 = 42
  1111111001 = B1
  1111111010 = C1
Codes of length 11 bits:
  11111110110 = 15
  11111110111 = 52
  11111111000 = D1
  11111111001 = F0 (ZRL)
Codes of length 12 bits:
  111111110100 = 24
  111111110101 = 33
  111111110110 = 62
  111111110111 = 72
Codes of length 15 bits:
  111111111000000 = 82
Codes of length 16 bits:
  1111111110000010 = 09
  1111111110000011 = 0A
  1111111110000100 = 16
  1111111110000101 = 17
  1111111110000110 = 18
  1111111110000111 = 19
  1111111110001000 = 1A
  1111111110001001 = 25
  1111111110001010 = 26
  1111111110001011 = 27
  1111111110001100 = 28
  1111111110001101 = 29
```

AC Luminance

| Bit Pattern | Length |
|---|---|
| 00xxxxxx | 3 |
| 01xxxxxx | 4 |
| 100xxxxx | 6 |
| 1010xxxx | 4 |
| 1011xxxx | 8 |
| 1100xxxx | 5 |
| 11010xxx | 10 |
| 11011xxx | 7 |
| 11100xxx | 6 |
| 11101xxx | 7 |
| 1111000x | 13 |
| 1111001x | 10 |
| 111101xx | 8 |
| 11111000 | 15 |
| 11111001 | 10 |
| 11111010 | 9 |
| 11111011 | ● |
| 11111100 | 10 |
| 11111101 | ● |
| 11111110 | ● |
| 11111111 | ● |

6th bit is x.

7th bit is x.

Next 1 bit is x.

| Bit Pattern | Length |
|---|---|
| 0xxxxxxx | 13 |
| 1xxxxxxx | 11 |

| Bit Pattern | Length |
|---|---|
| 0xxxxxxx | 10 |
| 10xxxxxx | 18 |
| 11xxxxxx | 13 |

| Bit Pattern | Length |
|---|---|
| 00xxxxxx | 12 |
| 01xxxxxx | 11 |
| 10xxxxxx | 11 |
| 110xxxxx | 16 |
| 111xxxxx | 13 |

| Bit Pattern | Length |
|---|---|
| 000xxxxx | 12 |
| 001xxxxx | 11 |
| 0100xxxx | 16 |
| 0101xxxx | 15 |
| 011xxxxx | 14 |
| 1000000x | 17 |
| 10000010 | 25 |
| 10000011 | 26 |
| 10000100 | 22 |
| ...... | ... |
| 11111110 | 26 |
| 11111111 | ERROR |

4th bit is x.

Fig. 14

DC Chrominance

| Bit Pattern | Length |
|---|---|
| 00xxxxxx | 2 |
| 01xxxxxx | 3 |
| 10xxxxxx | 4 |
| 110xxxxx | 6 |
| 1110xxxx | 8 |
| 11110xxx | 10 |
| 111110xx | 12 |
| 1111110x | 14 |
| 11111110 | 16 |
| 11111111 | |

| Bit Pattern | Length |
|---|---|
| 0xxxxxxx | 18 |
| 10xxxxxx | 20 |
| 110xxxxx | 22 |
| 111xxxxx | ERROR |

Fig. 15

AC Chrominance

| Bit Pattern | Length |
|---|---|
| 00xxxxxx | 2 |
| 01xxxxxx | 3 |
| 100xxxxx | 5 |
| 1010xxxx | 7 |
| 1011xxxx | 5 |
| 11000xxx | 9 |
| 11001xxx | 10 |
| 1101xxxx | 6 |
| 111000xx | 12 |
| 111001xx | 8 |
| 11101xxx | 7 |
| 1111000x | 14 |
| 1111001x | 8 |
| 1111010x | 8 |
| 11110110 | 11 |
| 11110111 | 10 |
| 11111000 | 10 |
| 11111001 | 9 |
| 11111010 | ● |
| 11111011 | ● |
| 11111100 | 10 |
| 11111101 | ● |
| 11111110 | ● |
| 11111111 | ● |

5th bit is x.
6th bit is x.
Next bit is x.

| Bit Pattern | Length |
|---|---|
| 0xxxxxxx | 17 |
| 1xxxxxxx | 13 |

| Bit Pattern | Length |
|---|---|
| 0xxxxxxx | 11 |
| 1xxxxxxx | 10 |

| Bit Pattern | Length |
|---|---|
| 0xxxxxxx | 10 |
| 10xxxxxx | 18 |
| 11xxxxxx | 13 |

| Bit Pattern | Length |
|---|---|
| 0xxxxxxx | 10 |
| 10xxxxxx | 19 |
| 11xxxxxx | 13 |

| Bit Pattern | Length |
|---|---|
| 00xxxxxx | 13 |
| 01xxxxxx | 12 |
| 10xxxxxx | 10 |
| 110xxxxx | 16 |
| 111xxxxx | 13 |

| Bit Pattern | Length |
|---|---|
| 000xxxxx | 13 |
| 001xxxxx | 12 |
| 0100xxxx | 22 |
| 0101xxxx | 18 |
| 011xxxxx | 16 |
| 100000xx | 15 |
| 1000010x | 20 |
| 1000011x | 16 |
| 10001000 | 23 |
| ...... | ... |
| 11111110 | 26 |
| 11111111 | ERROR |

4th bit is x.

Fig. 16

| 1111111111011000...... |

Forward Scan to
locate final MCU
(full/partial)

| 1111111101010001 ...... |

Forward Scan for joint
validation check and to
locate final MCU

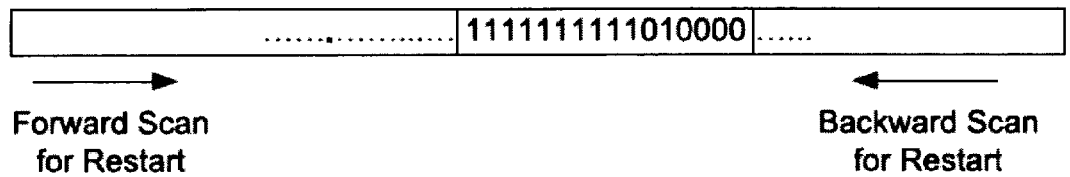
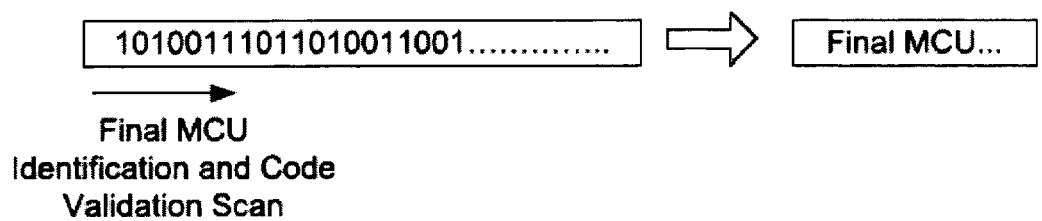
Fig. 19
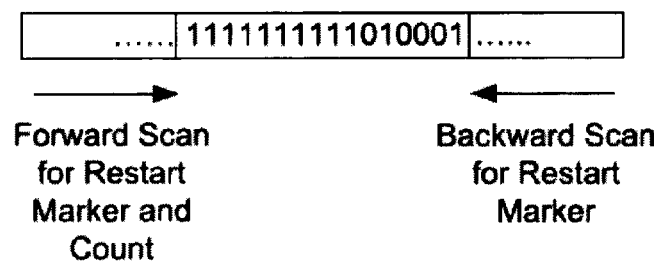
Fig. 20

METHOD AND DEVICE FOR REASSEMBLING A DATA FILE

CROSS-REFERENCE TO RELATED APPLICATIONS

The present application claims the benefit of the U.S. provisional patent application 61/376,698 filed on 25 Aug. 2010, the entire contents of which are incorporated herein by reference for all purposes.

TECHNICAL FIELD

Embodiments relate generally to file carving. Specifically, embodiments relate to a method and a device for reassembling a data file from a plurality of file fragments.

BACKGROUND

The increasing reliance on digital storage devices such as hard disks and solid state disks for storing important private data and highly confidential information has resulted in a greater need for efficient and accurate data recovery of deleted files during digital forensic investigation.

File carving is a technique to recover such deleted files in the absence of file system allocation information. However, there are often instances where files are fragmented due to low disk space, file deletion and modification. For example, 96.5% of the files tested on the FAT disks had between 2 to 20 fragments in a recent study. A deleted fragmented file usually composes header fragment, intermediate fragments and footer fragment. These fragments are not stored in contiguous blocks and may be out of sequence on the disk. Without the file allocation information existing on the file system, it is difficult to recover deleted fragmented files. The problem is further complicated due to the non-standardized sizes of the files and the fragments. This scenario of fragmented and subsequently deleted files presents a challenge requiring a more advanced form of file carving techniques to reconstruct the files from the extracted data fragments.

The reconstruction of files from a collection of randomly mixed fragments is useful and essential in the field of Digital Forensics in the situation that the files which can assist in crime investigation have been deleted. For example, the files may have been accidentally deleted by the owner/user, or the file system information may has been damaged with the information to retrieve the fragmented files destroyed.

Bifragment gap carving is one fragmented file carving approach, which assumes that most fragmented files comprises two fragments that contain identifiable headers and footers. This technique exhaustively searched for all the combinations of blocks between an identified header and footer, while incrementally excluding blocks that result in unsuccessful decoding/validation of the file. This approach could only support carving for files with two fragments.

In another approach, the file fragments are "mapped" into a file by utilizing different mapping functions and discriminators. These mapping functions represent various ways for which a file can be reconstructed and the discriminators check the validity of the reconstructed file until the best one is obtained. The object of this approach is to derive a mapping function which minimizes the error rate in the discriminator. Accordingly, it is necessary to construct a good discriminator to localize errors within the file, so that discontinuities can be determined more accurately. If the discriminator fails to indicate the precise locations of the errors, then all the permutations need to be generated, which could become intractable.

In carving, the basic and simplest approach would be to test each fragment against one another to check how likely any two fragments is a valid joint match. Joints are then assigned weights and these weights represent the likelihood that the two fragments are a correct match. Since the header can be easily identified, any edge joining the header is considered a single directional edge while all other edges are bi-directional. Therefore, if there are n fragments (excluding headers, h), there will be a total of n(n−1+h) weights. The problem can thus be converted into a graph theoretic problem where the fragments are represented by vertices and the weights assigned to the edges indicating the likelihood that two fragments are adjacent in the original file. The carving is based on finding a file construction path with the best set of edge weights. In this case, the starting vertices will correspond to the headers. Greedy heuristic based techniques have been used to computer weights between all fragments and sort fragments according to weights for each fragment. This approach performs a pre-computation of all the weights between two fragments, which is computationally expensive.

A further approach is based on sequential hypothesis testing which assumes contiguous blocks assignment for file storage on disk. This approach joins next block in sequence to current block, performs file fragment processing using existing libraries and applications, and performs boundary testing of joint to determine validity of the joint. However, the assumption may be weak.

In another aspect, if the fragmented file is a compressed file, such as a JPEG images, the problem of file carving is made even harder as the entire file has been encoded based on the header information and with the separated fragments, the fragment joints can not be detected simply by comparing adjacent pixels.

An approach for reassembly of a fragmented JPEG file is based on the assumption that vertically oriented lines are repeated in the DV value chain at a certain interval. The approach searches for pairs of fragments with valid Restart marker sequences, and verify joints based on repeated value checking.

It is desired to improve the resource consumption, scalability, overhead incurrence and weak assumptions in existing methods.

It is also desired to provide an efficient method to reassemble a data file, taking into consideration of realistic and complex fragmentation scenarios.

It is further desired to provide an efficient method to reassemble a data file which has been encoded.

SUMMARY

Various embodiments provide a method for reassembling a data file from a starting file fragment and a plurality of file fragments stored on a digital storage device. The method includes determining, from the plurality of file fragments, one or more matched file fragments which match the starting file fragment based on a first predetermined criterion; associating the one or more matched file fragments with the starting file fragment; and determining one or more candidate data files based on the one or more matched file fragments. The method further includes checking if more than one file fragments have been determined to match the starting file fragment based on the first predetermined criterion. If more than one matched file fragments have been determined to match the starting file fragment based on the first predetermined criterion, the method further includes selecting a candidate data file from the candidate data files determined for the matched file fragments as the reassembled data file based on a second predetermined criterion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 6 shows the confirmed fragment determination according to an embodiment.

FIG. 7 illustrates the same best-weight candidate determined for more than one starting fragment according to an embodiment.

FIG. 13 shows a JPEG AC Luminance table.

FIG. 14 shows a correspondence table generated according to the embodiment based on the JPEG AC Luminance table of FIG. 13.

FIGS. 15 and 16 show exemplary tables generated based on JPEG DC Chrominance table and JPEG AC Chrominance table, respectively.

FIG. 19 shows the scanning conducted on a header fragment in the event that the restart markers are provided.

FIG. 20 shows the scanning conducted on a file fragment in the event that the restart markers are provided.

DESCRIPTION

Figure 1:
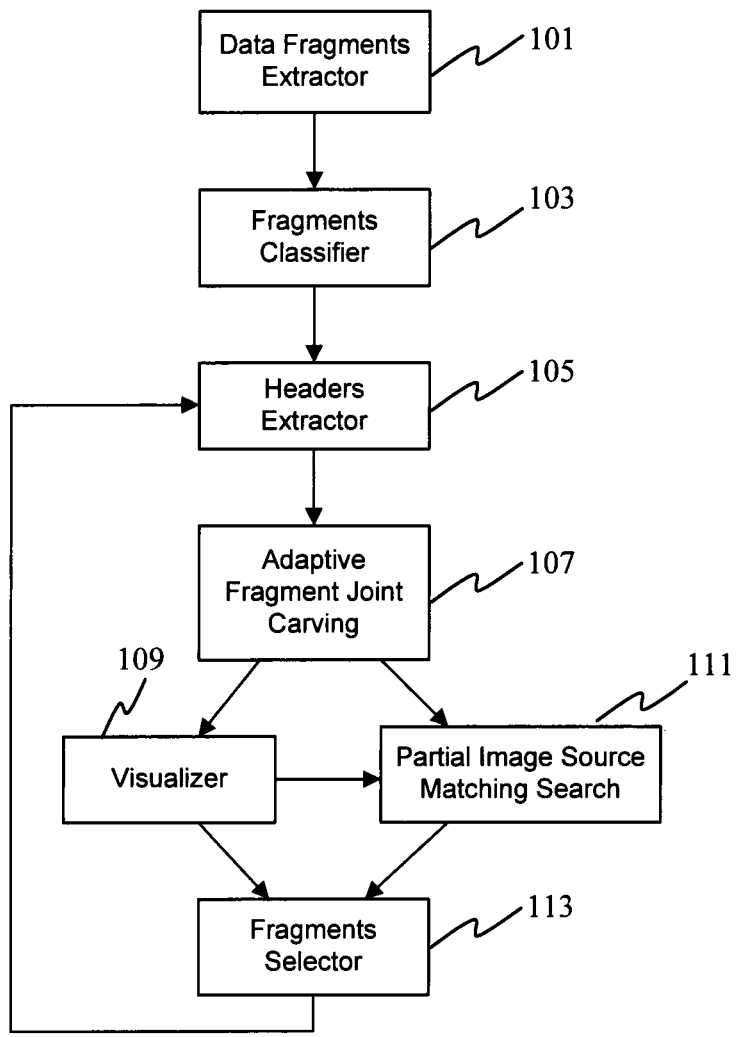
FIG. 1 shows a flow diagram for assembling a data file according to an embodiment.

Various embodiments provide a method for reassembling a data file. Various features described below in the context of the data file reassembling method may analogously hold true for the corresponding device, and vice versa.

One embodiment is directed to a method for reassembling a data file from a starting file fragment and a plurality of file fragments stored on a digital storage device. The method includes determining, from the plurality of file fragments, one or more matched file fragments which match the starting file fragment based on a first predetermined criterion; associating the one or more matched file fragments with the starting file fragment; and determining one or more candidate data files based on the one or more matched file fragments. The method further includes checking if more than one file fragments have been determined to match the starting file fragment based on the first predetermined criterion. If more than one matched file fragments have been determined to match the starting file fragment based on the first predetermined criterion, the method further includes selecting a candidate data file from the candidate data files determined for the matched file fragments as the reassembled data file based on a second predetermined criterion.

According to an embodiment, determining one or more candidate data file based on the one or more matched file fragments includes associating further matched file fragments with the one or more matched file fragments.

In an embodiment, selecting the reassembled data file from the candidate data files may be based on the size of the candidate data files. For example, the sizes of the candidate data files may be checked to see whether one or more files exceed the file size if the file size information is specified in the file.

In an embodiment, determining the matched file fragments includes determining a weight for each file fragment and selecting one or more file fragments which match the starting fragment based on the weight of each file fragment, the weight representing a degree of matching between the file fragment and the starting file fragment.

In one embodiment, the weight may be determined based on pixel matching, wherein the total number of pixels matching along the edges for the starting fragment and the file fragment are summed. Each pixel value in one fragment is compared with the corresponding pixel value in the other fragment. The closer the values, the better the match. In another embodiment, the weights may be determined based on median edge detection. Each pixel is predicted from the value of the pixel above, to the left and left diagonal to it. Using median edge detection, the absolute value of the difference between the actual value and the predicted value in the adjoining fragment are summed to determine the weight. In a further embodiment, the weights may be determined based on the sum of differences, which is calculated across the pixel values of the edge of one fragment with the other fragment.

According to an embodiment, the weights of the matched file fragments are modified based on the number of file fragments determined to match the starting file fragment, if more than one file fragments have been determined to match the starting file fragment. A file fragment which matches the starting file fragment is determined based on the modified weights and the weights of the remaining file fragments.

In one embodiment, the weights of the matched file fragments may be modified to be inversely proportional to the number of file fragments determined to match the starting file fragment.

In an embodiment, selecting the reassembled data file from the candidate data file includes comparing the candidate data files according to the second predetermined criterion and selecting the reassembled data file based on the result of the comparison.

In an embodiment, selecting the reassembled data file from the candidate data files comprises comparing accumulated weights of the candidate data files. For example, the candidate data files having the best weight may be selected.

Another embodiment is directed to a device for processing for reassembling a data file from a starting file fragment and a plurality of file fragments stored on a digital storage device. The device includes a processor; and a storage device storing instructions which, when executed by the processor, cause the processor to perform a method. The method includes determining, from the plurality of file fragments, one or more matched file fragments which match the starting file fragment based on a first predetermined criterion; associating the one or more matched file fragments with the starting file fragment; determining one or more candidate data files based on the one or more matched file fragments; checking if more than one file fragments have been determined to match the starting file fragment based on the first predetermined criterion; and selecting a candidate data file from the candidate data files determined for the matched file fragments as the reassembled data file based on a second predetermined criterion, if more than one matched file fragments have been determined to match the starting file fragment based on the first predetermined criterion.

Another embodiment is directed to a method for reassembling a data file from one or more starting file fragments and a plurality of file fragments stored on a digital storage device. The method may include determining, from the plurality of file fragments, one or more matched file fragments which match a respective starting file fragment based on a weight representing a degree of matching between each file fragment and the respective starting file fragment; checking whether the same file fragment is determined to match more than one starting file fragments and whether the weights between the same file fragment and the more than one starting file fragments are the same; modifying the weights of the file fragment with respect to the more than one starting file fragments based on the number of the more than one starting file fragments, if the same file fragment have been determined to match more than one starting file fragments and the weights between the same file fragment and the more than one starting file fragments have been determined to be the same; and determining a file fragment to be associated with the respective starting file fragment based on the modified weights and the weights of the remaining file fragments.

According to an embodiment, the weights of the file fragment with respect to the more than one starting file fragments are modified to be inversely proportional to the number of more than one starting file fragments.

In an embodiment, the method further include checking whether more than one matched file fragments are determined for the respective starting file fragment; and modifying the weights of the more than one matched file fragments based on the number of matched file fragments determined for the respective starting file fragment, if more than one matched file fragments have been determined to match the respective starting file fragment. In an embodiment, one possible way is that the weights of the matched file fragments may be modified to be inversely proportional to the number of matched file fragments for each starting file fragment.

Another embodiment is directed to a device for reassembling a data file from one or more starting file fragments and a plurality of file fragments stored on a digital storage device. The device may include a processor, and a storage device storing instructions which, when executed by the processor, cause the processor to perform a method. The method includes determining, from the plurality of file fragments, one or more matched file fragments which match a respective starting file fragment based on a weight representing a degree of matching between each file fragment and the respective starting file fragment; checking whether the same file fragment is determined to match more than one starting file fragments and whether the weights between the same file fragment and the more than one starting file fragments are the same; modifying the weights of the file fragment with respect to the more than one starting file fragments based on the number of the more than one starting file fragments, if the same file fragment have been determined to match more than one starting file fragments and the weights between the same file fragment and the more than one starting file fragments have been determined to be the same; and determining a file fragment to be associated with the respective starting file fragment based on the modified weights and the weights of the remaining file fragments.

A further embodiment is directed to a method for reassembling a data file from a starting file fragment and a plurality of file fragments stored on a digital storage device, wherein the starting file fragment and the plurality of file fragments comprise a plurality of codes. The method may include determining a block length corresponding to each code, the block length representing the number of bits occupied by the code and the corresponding data following the code; scanning the starting file fragment by stepping over the corresponding block length each time a code is identified, until an end sub-segment is determined at the end of the starting file fragment; determining an initial sub-segment for each of the plurality of file fragments; and determining, from the plurality of file fragments, a file fragment to be associated with the starting file fragment based on a comparison of the end sub-segment of the starting file fragment with the initial sub-segments of the plurality of file fragments.

According to an embodiment, determining the file fragment to be associated with the starting file fragment includes determining a weight for each file fragment based on the comparison of the end sub-segment of the starting file fragment with the initial sub-segments of the plurality of file fragments, and selecting the file fragment based on the weight of each file fragment, the weight representing a degree of matching between the file fragment and the starting file fragment.

According to an embodiment, the method further includes scanning each of the plurality of file fragments by stepping over the corresponding block length each time a code is identified, until an end sub-segment is determined at the end of each file fragment; and classifying the starting file fragment and the plurality of file fragments into one or more classes based on the end sub-segments.

In an embodiment, a file fragment to be associated with the starting file fragment is determined based on a comparison of the end sub-segment of the starting file fragment with the initial sub-segments of the file fragments classified into the same class with the starting file fragment.

A further embodiment is directed to a device for reassembling a data file from a starting file fragment and a plurality of file fragments stored on a digital storage device, wherein the starting file fragment and the plurality of file fragments comprise a plurality of codes. The device may include a processor, and a storage device storing instructions which, when executed by the processor, cause the processor to perform a method. The method includes determining a block length corresponding to each code, the block length representing the number of bits occupied by the code and the corresponding data following the code; scanning the starting file fragment by stepping over the corresponding block length each time a code is identified, until an end sub-segment is determined at the end of the starting file fragment; determining an initial sub-segment for each of the plurality of file fragments; and determining, from the plurality of file fragments, a file fragment to be associated with the starting file fragment based on a comparison of the end sub-segment of the starting file fragment with the initial sub-segments of the plurality of file fragments.

In this context, the storage device in the various data file reassembling devices as described in the above embodiments may include a memory which is for example used to store instructions which, when executed by the processor, cause the processor to perform the method of various embodiments. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the processor in the various data file reassembling devices as described in this description may be or may include a circuit for processing the fragments.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

FIG. 1 shows a flow diagram for assembling a data file according to an embodiment.

At 101, data fragments, also referred to as file fragments are extracted, e.g. from a digital storage device storing the file fragments.

The file fragments are classified at 103. For example, the file fragments may be classified into header fragments, intermediate file fragments, and footer fragments, dependent on the information of the formats of various file types.

The header fragments are extracted at 105, such that these header fragments are used as the starting fragments to search for the intermediate file fragments and footer fragments to be associated with the respective header fragment.

Staring from the header fragments, adaptive fragment joint carving is performed on the file fragments at 107, according to various embodiments described in more detail below, to determine the respective file fragment to be associated with the respective header fragment. In other words, the respective fragment joints are determined.

The determined fragment joints may be visualized at 109, e.g. to validate whether the determined fragment joints are valid joints.

A partial image source matching search algorithm is performed at 111 based on the determined fragment joints and the visualized result at 109, to provide further indication of whether the determined fragment joints are valid. For example, multiple copies of some files, in this example, image files, may be present. If sufficient partial images have been recovered, a search may be performed on the remaining file fragments on the digital storage device to match the remaining fragments to a similar partial image, which would increase the speed of reassembling of the file fragments to reconstruct the data file.

Fragment joints which are determined to be valid joints are then determined, and the file fragments with the valid joints are selected at 113 to be associated with the respective header fragment.

The adaptive fragment joint carving and the validation of the determined fragment joints described above may be further performed over the selected file fragments at 113, taking the selected fragments associated with the respective header fragment as the starting fragments to determine further file fragments. The process may be repeated until all the file fragments have been reassembled, e.g. when all the footer fragments have been associated with the respective header fragment.

Figure 2:
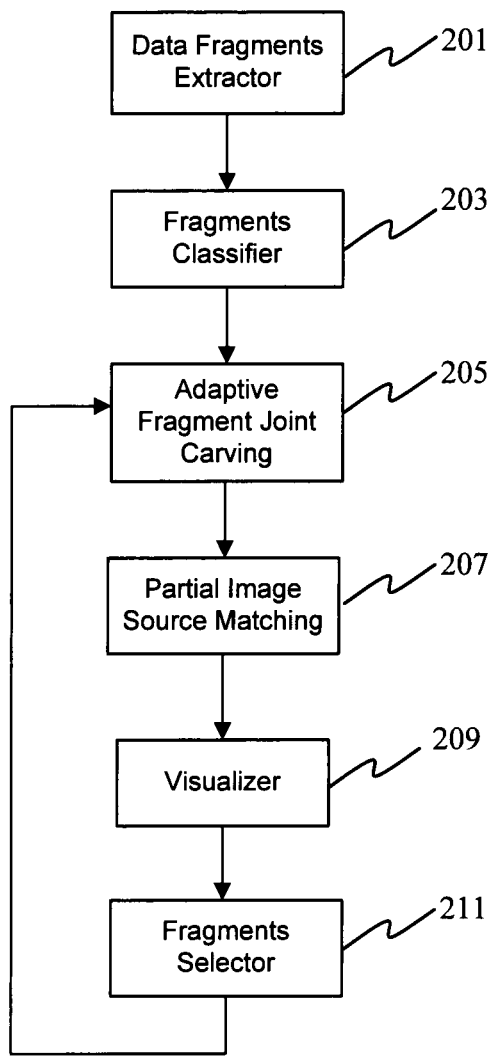
FIG. 2 shows a flow diagram for assembling a data file according to another embodiment.

FIG. 2 shows a flow diagram for assembling a data file according to another embodiment.

At 201, data fragments are extracted from a digital storage device storing the data fragments.

The data fragments are classified at 203. For example, the data fragments may be classified into header fragments, intermediate file fragments, and footer fragments, dependent on the information of the formats of various file types.

Adaptive fragment joint carving is performed on the data fragments at 205, according to various embodiments described in more detail below. The adaptive fragment joint carving may initially start from the header fragments to determine the respective data fragment, e.g. the intermediate file fragments or footer fragments, to be associated with the respective header fragment. In other words, the respective fragment joints are determined.

A partial image source matching algorithm is performed at 207 based on the determined fragment joints, to provide an indication of whether the determined fragment joints are valid.

The determined fragment joints may be visualized at 209, e.g. to further validate whether the determined fragment joints are valid joints.

Based on the validation results in 207 and 209, the data fragments with the valid joints are selected at 211 to be associated with the respective header fragment.

The adaptive fragment joint carving and the validation of the determined fragment joints described above may be further performed over the selected file fragments at 211, taking the selected fragments associated with the respective header fragment as the starting fragments to determine further data fragments. The process may be repeated until all the data fragments have been reassembled, e.g. when all the footer fragments have been associated with the respective header fragment.

Figure 3:
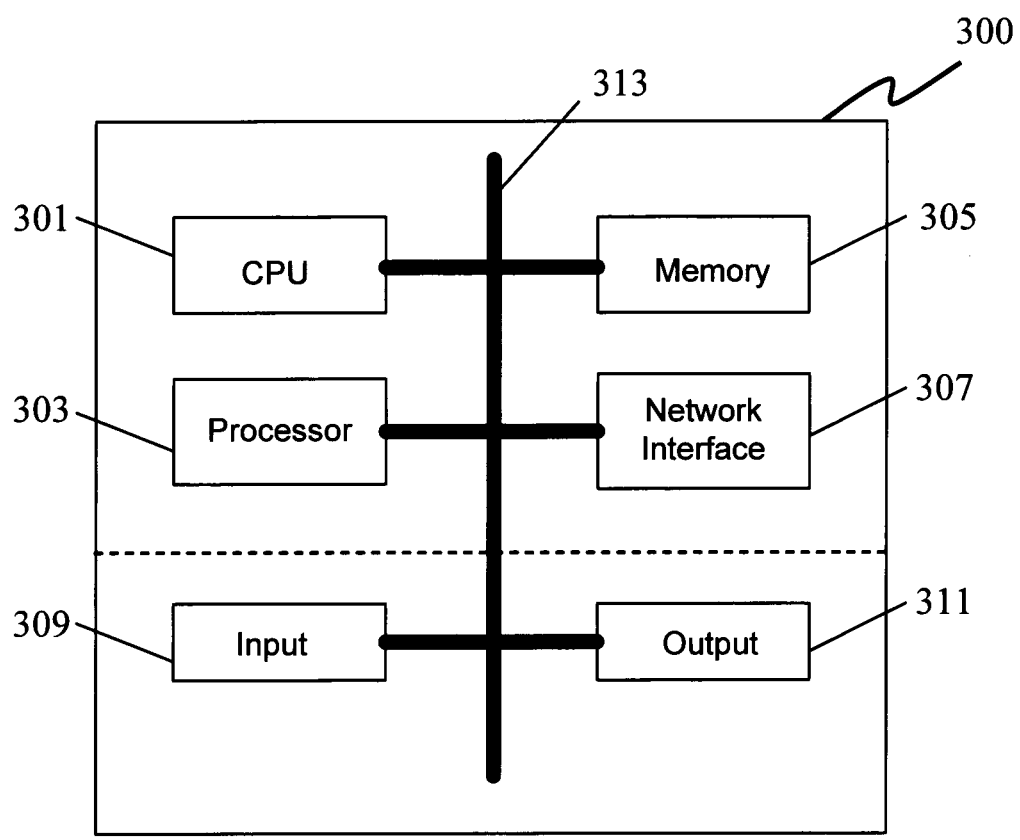
FIG. 3 shows a schematic diagram of a device for reassembling a data file according to various embodiments.

FIG. 3 shows a schematic diagram of a device for reassembling a data file according to various embodiments.

The device 300, also referred to as a file carving device, may be implemented by a computer system. In various embodiments, the fragment classifier, the header extractor, the adaptive fragment joint carving, the visualizer, the partial image source matching algorithm and the fragment selector may also be implemented as modules executing on one or more computer systems.

The computer system may include a CPU 301 (central processing unit), a processor 303, a memory 305, a network interface 307, input interface/devices 309 and output interface/devices 311. All the components 301, 303, 305, 307, 309, 311 of the computer system 300 are connected and communicating with each other through a computer bus 313.

The memory 305 may be used for storing the various file fragments, the intermediate determined fragment joints, the intermediate determined weights for the fragment joints, the intermediate determined candidate data files, the final fragment joints and the final data files used and determined according to the method of the embodiments. The memory 305 may include more than one memory, such as RAM, ROM, EPROM, hard disk, etc. wherein some of the memories are used for storing data and programs and other memories are used as working memories.

In an embodiment, the memory 305 may be configured to store instructions for reassembling data files according to various embodiments above. The instructions, when executed by the CPU 301, may cause the CPU 301 to reassembling the plurality of file fragments in a proper sequence. The instruction may also cause the CPU 301 to initiate a storage activity onto the memory 305 to store the intermediate determined fragment joints, the intermediate determined weights for the fragment joints, the intermediate determined candidate data files, the final fragment joints and the final data files determined according to the method of the embodiments.

In another embodiment, the processor 303 may be a special purpose processor, in this example, a file carving processor, for executing the instructions described above.

The CPU 301 or the processor 303 may be used as the file carving device as described in various embodiments below, and may be connected to an internal network (e.g. a local area network (LAN) or a wide area network (WAN) within an organization) and/or an external network (e.g. the Internet) through the network interface 307, for example, to reassembling fragments stored on a network storage device or a remote storage device.

The Input 309 may include a keyboard, a mouse, etc. The output 311 may include a display for display the data files reassembled in the embodiments below.

The method for reassembling data files according to various embodiments are described below.

From the raw data acquired from a storage device, a plurality of file fragments are acquired. Header fragments are extracted from the plurality of file fragments, so that the header fragments may be used as the starting fragments to search for associated file fragments.

Figure 4:
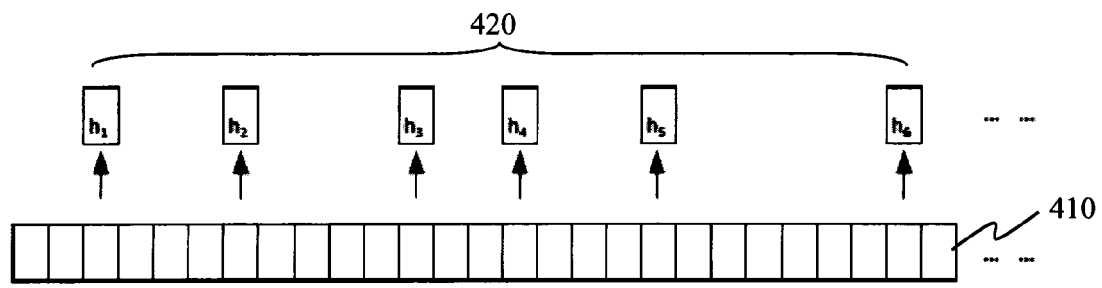
FIG. 4 illustrates header fragment extraction according to an embodiment.

FIG. 4 illustrates header fragment extraction according to an embodiment.

As shown in FIG. 4, from the raw data including a plurality of file fragments 410, a plurality of header fragments 420 are extracted. h1, h2, h3, h4, h5, h6 . . . represents the header fragments 420 extracted. The header fragments may be extracted based on the format and the processing algorithm of various file types.

After extracting header fragments 420, the remaining fragments are processed for progressive multi-level weight computation, path-based candidate sorting and reassembly as described below.

Figure 5:
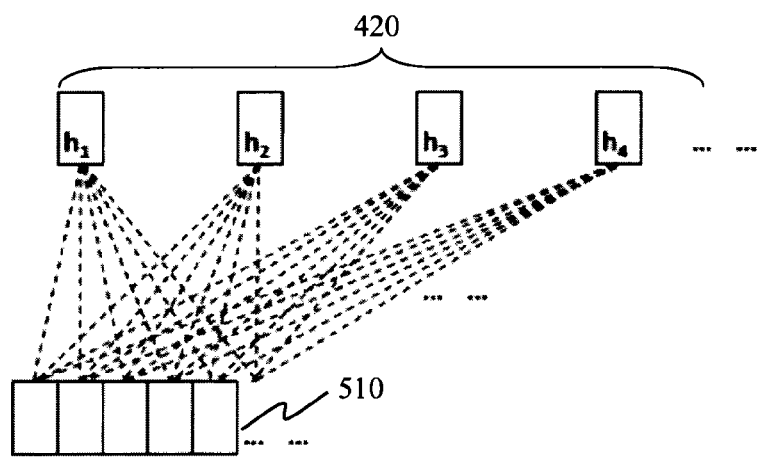
FIG. 5 illustrates possibilities of joining all fragments according to an embodiment.

FIG. 5 illustrates the possible fragment joints among a plurality of fragments according to an embodiment.

As shown in FIG. 5, the first level weights for the fragment joints are determined, sorted and stored. For each header fragment 420, a plurality of weights are determined for the fragments joints joining the header fragment with the remaining non-header fragments 510.

The weight for the fragment joint may be determined by comparing the header fragment with the non-header fragment. For example, if the fragments 420, 510 are image file fragments, the weight between the header fragment and the non-header fragment may be determined based on pixel matching, wherein the total number of pixels matching along the edges for the two fragments are summed. Each pixel value in one fragment is compared with the corresponding pixel value in the other fragment. The closer the values, the better the match. In another example, the weights may be determined based on median edge detection. Each pixel is predicted from the value of the pixel above, to the left and left diagonal to it. Using median edge detection, the absolute value of the difference between the actual value and the predicted value in the adjoining fragment are summed to determine the weight. In a further example, the weights may be determined based on the sum of differences, which is calculated across the pixel values of the edge of one fragment with the other fragment.

After determining the weights, the plurality of weights for each header fragment 420 are sorted to determine a best weight representing the highest degree of matching between the header fragment and the corresponding non-header fragment 510. Accordingly, the corresponding non-header fragment 510 with the best weight is determined to be a best-weight candidate for the header fragment. For example, when the weights are determined based on pixel matching, the weight with the highest value is the best weight. In another example wherein the weights are determined based on median edge detection or sum of differences, the weight with the lowest value is the best weight.

FIG. 6(a) shows the best-weight candidates determined for the header fragments according to an embodiment. The joints or the paths 610 between the best-weight candidates and the respective header fragment are represented by dashed lines. As shown in FIG. 6(a), a file fragment labeled as $f_5$ is the best-weight candidate fragment for the header fragment $h_1$.

The determined best-weight joints 610 for all header fragments are compared to determine one fragment joint 620 having the best weight among these candidates as a confirmed fragment joint. As shown in FIG. 6(b), the joint 620 between the header fragment $h_2$ and the file fragment $f_9$ has the best weight among the four joints 610 of FIG. 6(a), and the confirmed joint 620 is represented by a solid line.

The sorted fragment joint list for the previous fragment $h_2$ for which a confirmed fragment joint has been determined is removed, in order to save process memory. The confirmed file fragment $f_9$ is also removed from the set of fragments and all the sorted lists for other header fragments. In an embodiment wherein the confirmed file fragment $f_9$ is a footer fragment, the entire path of the header fragment $h_2$ is also removed from the dataset under processing.

The above process is repeated for the non-completed paths. In the event that a confirmed best-weight joint fragment is not the footer fragment, the carver removes the sorted joint list for the previous fragment $h_2$. The confirmed fragment $f_9$ is also removed from the set of fragments and all the sorted lists for other header fragments. The joint weights of the confirmed fragment to the remaining $(n-h-f_c)$ fragments are then computed, wherein n represents the total number of fragments excluding header fragments, h represents the total number of header fragments, and $f_c$ represents the number of confirmed fragments at the current stage. The joint list for the confirmed fragment is sorted and the carving process is repeated as above.

FIG. 7 illustrates the same best-weight candidate determined for more than one starting fragment according to an embodiment.

As shown in FIG. 7, a candidate fragment $f_5$ is determined to be the best-weight candidate for more than one starting fragments $h_1$ and $f_1$ in different paths. The fragment joint 710, $h_1$-$f_5$, and the fragment joint 720, $f_1$-$f_5$, are compared, e.g. by comparing their joint weights. The fragment joint 720 with the better weight than the fragment joint 710 is are selected (represented by a solid line 740) such that the candidate fragment $f_5$ of the selected joint is determined as a confirmed fragment for the starting fragment $f_1$. The sorted joint list fro the fragment $f_1$ is then removed to save memory space. The fragment joint 710 is changed to remove the confirmed fragment $f_5$ from the joint 710, and the next best matching fragment $f_8$ in the sort list of the starting fragment $h_1$ is determined in a new fragment joint 730 for the starting fragment $h_1$.

Figure 8:
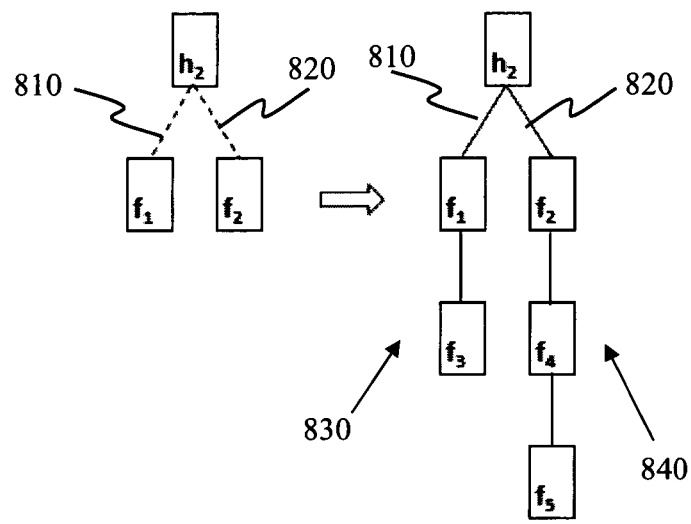
FIG. 8 illustrates more than one matched fragments determined for a starting fragment according to an embodiment.

FIG. 8 illustrates more than one matched fragments determined for a starting fragment according to an embodiment.

As shown in FIG. 8, the file fragment $f_1$ and the fragment $f_2$ are both determined to be the best-weight candidate for the starting fragment $h_2$. Accordingly, two fragment joints 810, 820 are determined for the starting fragment $h_2$. According to an embodiment, the two fragments $f_1$ and the fragment $f_2$ are both associated with the starting fragment $h_2$, and two complete paths 830, 840 are determined based on the two fragments $f_1$ and the fragment $f_2$. The two complete paths 830, 840 may form two reassembled candidate data files. Since there can be only one valid path from the header fragment $h_2$, one of the paths 830, 840 is selected to reassemble a correct data file based on an automated error detection. In one embodiment, the automated error detection may be based on a comparison of the sizes of the two candidate data files, e.g. by checking whether the file size indicates a premature overlimit. In another embodiment, the automated error detection may be based on a comparison of the accumulated weights of the two paths 830, 840. The determined incorrect path is removed, and the candidate fragments in the removed path is used for further carving. The candidate fragments in the selected path are confirmed fragments, and are removed from the sorted joint lists for all the other fragments.

Figure 9:
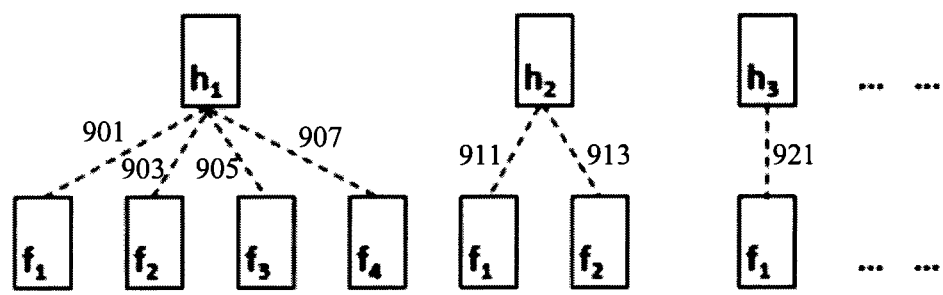
FIG. 9 illustrates more than one fragments determined to match a starting fragment and the same fragment determined to match more than one starting fragments according to an embodiment.

FIG. 9 illustrates more than one fragments determined to match a starting fragment and the same fragment determined to match more than one starting fragments according to an embodiment.

As shown in FIG. 9, 4 fragments are determined to match the starting fragment $h_1$, as depicted by 4 fragment joints 901, 903, 905, 907. 2 fragments are determined to match the starting fragment $h_2$, as depicted by 2 fragment joints 911, 913.

The same fragment $f_1$ is determined to match more than one starting fragments $h_1$, $h_2$, $h_3$, as depicted by the fragment joints 901, 911, 921. The same fragment $f_2$ is determined to match more than one starting fragments $h_1$, $h_2$, as depicted by the fragment joints 903, 913.

According to an embodiment, the weights of the matched fragments are modified based on the matched fragments, if more than one fragments are determined to match a starting fragment. For example, the joint weight for the fragment joints 901, 903, 905, 907 may be modified by a $\alpha$ modifier, wherein $\alpha<1$, $\alpha$ is adjusted based on the number of matched fragments determined for the same starting fragment. In one example, a is determined to be inversely proportional to the number of matched fragments.

According to another embodiment, the weights of a matched fragment with respect to more than one starting fragments are modified based on the number of matched starting fragments, if the same fragment are determined to match more than one starting fragments. For example, the joint weights for the fragment joints 901, 911, 921 may be modified by a $\beta$ modifier, wherein $\beta<1$. $\beta$ is adjusted based on the number of different paths where a particular best-weight candidate appears in. In one example, $\beta$ is determined to be inversely proportional to the number of starting fragments to which the candidate fragment is determined to match.

In an embodiment wherein more than one fragments are determined to match a starting fragment and the same fragment are determined to match more than one starting fragments, both modifiers $\alpha$ and $\beta$ above may be applied. The final weight of a fragment joint may then be determined as $(\alpha*\beta*\omega_j)$, where $\omega_j$ is the original joint weight.

The various embodiments above provide a progressive joint carving method, which takes into consideration the realistic characteristics of the fragmentation of files during storage (i.e. based on the rationale that fragmentation causes overhead and is avoided by file systems unless necessary) and performs progressive joint weights computation, comparison and fragments joining. Compared to existing methods, storage is only required for the sorted lists of the weights of the remaining joints to the last confirmed fragment in the construction paths and therefore, it amounts to significant memory conservation. The storage requirement dynamically decreases when the paths are completed and when the fragments are confirmed. Weight computations of the other fragments to the header fragments are not required. The number of computations of the link/joint weight also decreases when the paths are completed and the fragments are confirmed. In addition, weight computations of the footer fragments to the other remaining fragments are also not required, resulting in a further reduction in terms of computational processing. Accordingly, the method of the embodiments achieves a low resource consumption due to dynamic release of resources and progressive reduction in resource requirement, and achieves low overhead due to minimized number of weight computation and comparisons. Thus, the method of the embodiments is scalable for reassembling large number of fragments. By removing the workload and time for un-necessary computations, a fast and thus efficient carving method is achieved.

Further, the method of various embodiments takes the complex scenarios into consideration to reassemble fragments in the best correct sequence, thereby achieving optimal carving performance.

The method of various embodiments is applicable in the field of digital forensics to recover files to support crime investigations, as well as in the more generic field of data/file recovery to support a more enhanced form of recovery in the event that the files have been accidentally deleted or the file system information damaged to prevent file retrievals.

Figure 10:
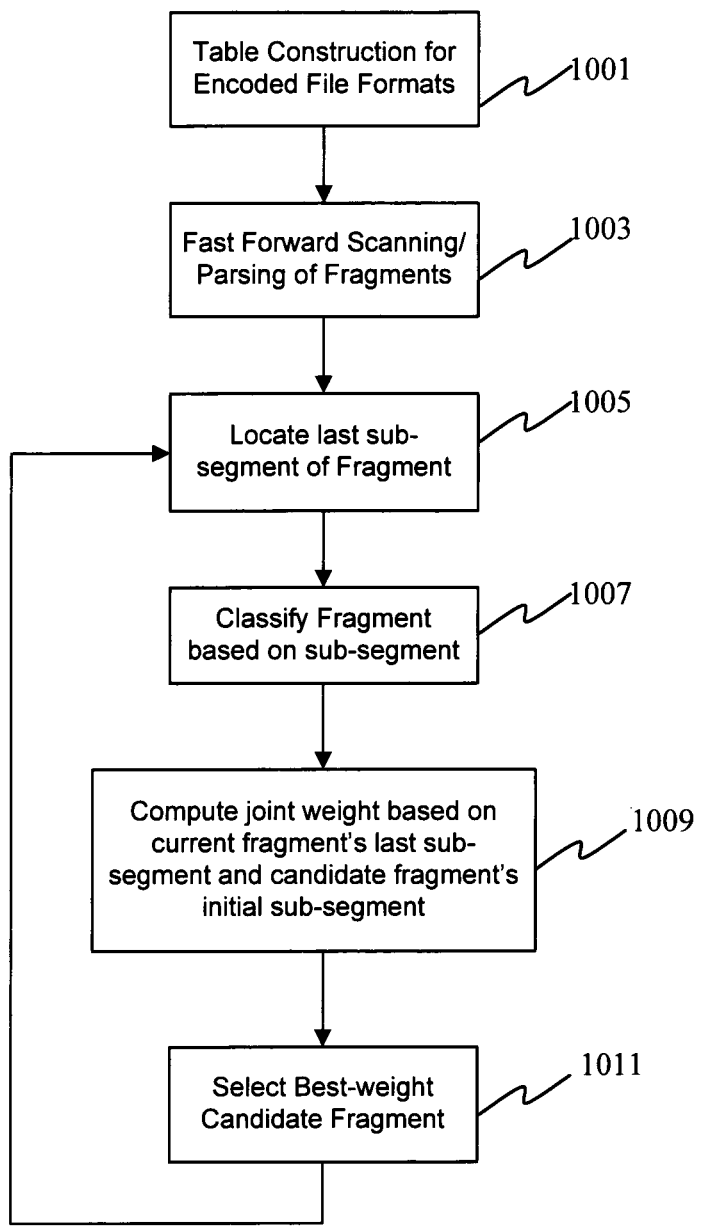
FIG. 10 shows a flow diagram for assembling a data file according to another embodiment.

FIG. 10 shows a flow diagram for assembling a data file according to another embodiment.

In the embodiment, the fragments of the data files may be in encoded form. Each fragment may include a plurality of codes.

A table is constructed for encoded file formats at 1001. In an embodiment, the table includes a correspondence between codes and corresponding block lengths. For each code, a block length is determined, which represents the number of bits occupied by the code and the corresponding data following the code, as will described in more detail below. The correspondence between the code and the block length may be determined based on the format of the encoded fragments.

Based on the constructed table at 1001, a forward scanning is preformed on the file fragments at 1003, for example, on a starting file fragment, by stepping over the corresponding block length each time a code is identified.

The scanning is performed on the starting file fragment until an end/last sub-segment, e.g. a minimum coding unit (MCU), is determined at the end of the starting file fragment at 1005. The end sub-segment may include the last fixed l components and variable k bits of residue data.

The file fragments are classified at 1007 based on the end sub-segment determined for each file fragment. In an embodiment wherein the file fragments are fragments of a JPEG file, the classification of file fragments may be based on the left-over bits in the end sub-segment, and the information of whether the file fragment include DC or AC coefficients and/or whether the file fragment include luminance or chrominance value.

The joint weight is determined at 1009 based on the end sub-segment of the starting file fragment and the initial sub-segment of the candidate file fragments. The initial sub-segment of the candidate may include the initial l components of the candidate file fragments. In this manner, it is not necessary to determine the joint weight based on the entire starting file fragment and the entire candidate file fragments, thereby saving computation costs and increasing processing speed. In an embodiment, the joint weights for candidate file fragments classified into the same class as the starting file fragment are determined.

According to the above embodiments, only the end sub-segment of each file fragment is used in the fragment classification and joint verification, resulting in conservation of time and computational resources in the carving process.

A candidate file fragment having the best-weight is selected at 1011 as the matched file fragment for the starting file fragment, and is associated with the starting file fragment. The matched file fragment is then used as a starting fragment for further carving.

The above process is repeated for the remaining starting fragments until all the file fragments have been reassembled.

The method described in FIG. 10 may be utilized in the adaptive fragment joint carving 107, 205 in FIGS. 1 and 2 above.

According to an embodiment, multi-step encoding tables are constructed in order to support a fast parsing and reconstruction of data files in which the data has been encoded. In the encoding tables, only the unique codes, the corresponding total number of bits of the encoded value, and its actual represented data are stored.

Figures 11, 12:
FIG. 11 shows a JPEG DC Luminance table.
FIG. 12 shows a table generated according to an embodiment, based on the JPEG DC Luminance table of FIG. 11.

FIG. 11 shows a JPEG DC Luminance table with codes of 2 to 9 bits length. Based on the JPEG DC Luminance table, a correspondence encoding table is generated according to the embodiment.

FIG. 12 shows a table generated according to an embodiment, based on the JPEG DC Luminance table of FIG. 11.

As shown in FIG. 12, the correspondence between a plurality of codes (i.e. bit patterns) and their corresponding block lengths are determined. For example, if the code of "1110" appears in the raw data, in this example, in a file fragment, it indicates that the component following this code has 6 bits (1110=06 as in FIG. 11). Accordingly, the corresponding block length is determined to be 10 bits, representing the number of bits occupied by the code "1110" (4 bits) and the data following the code (6 bits). Based on the determined block length from the table of FIG. 12, each time a byte with the bits "1110xxxx" is retrieved from a file fragment of the raw data, the file fragment may be scanned by skipping over 10 bits of data and setting the pointer to the location after these 10 bits, until the last sub-fragment of the file fragment is located. This process of skipping over irrelevant data may also be referred to as a fast forward scanning/parsing process. The carving method may retrieve entire bytes from the file fragment of the raw data for making "byte step" based comparisons with the entries in the generated multi-step tables to perform the fast forward scanning/parsing.

In an example wherein the data file is a JPEG file, the table is a 2-step table as the maximum code length is 16 bits. For each step of processing, 1 bytes (i.e. 8 bits) is retrieved since the minimum code length is shorter than 1 byte and the minimum unit to be retrieved on a computing system is 1 byte. In other examples, if the data file is other types of files for which the maximum code length is 48 bits and the minimum code length is 16 bits, the block length gradually increases in terms of a few bits for each code. 2 bytes may be retrieved for the first step of processing and 1 byte may be retrieved for subsequent processing steps, and accordingly the table may be a 5-step table.

Figure 13:
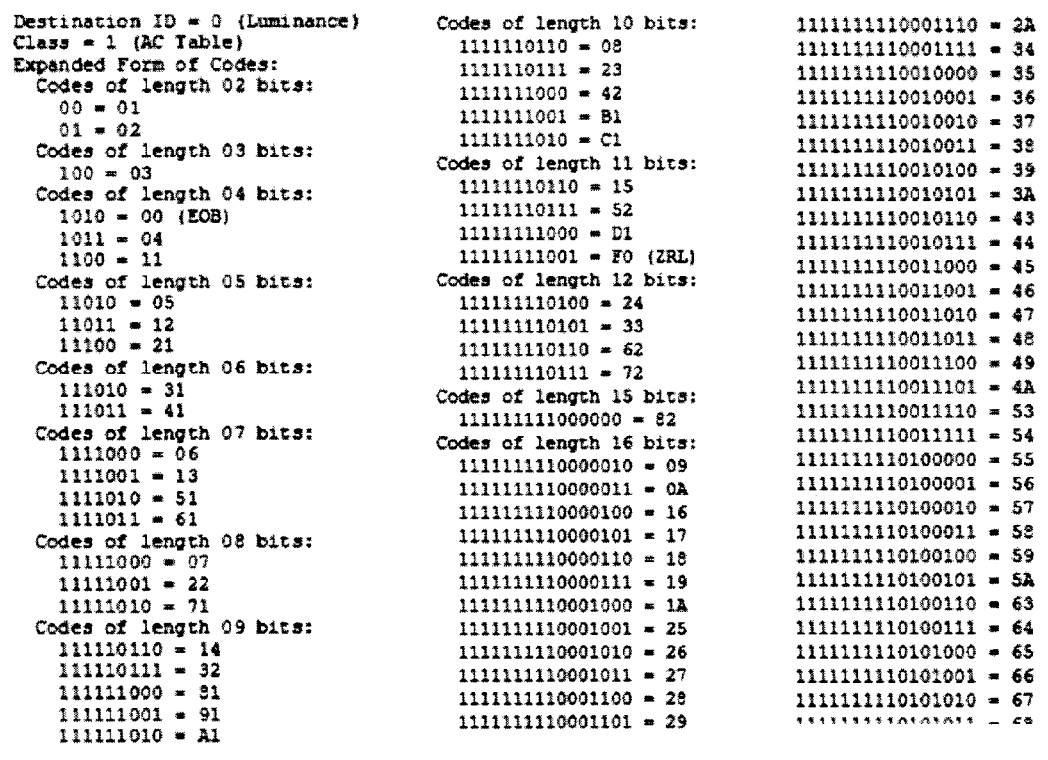

Similar to FIGS. 11 and 12 above, FIG. 13 shows a JPEG AC Luminance table, and FIG. 14 shows a correspondence table generated according to the embodiment based on the JPEG AC Luminance table of FIG. 13. FIGS. 15 and 16 shows exemplary tables generated based on JPEG DC Chrominance table and JPEG AC Chrominance table, respectively.

Another embodiment of determining the encoding tables is described below. Other than utilizing the "don't care" bits (i.e. "x" bits) of the values, it is observed that certain codes or codewords contain common location bits where the value does not affect the skip length. For example, according to FIG. 13, codewords "111010" and "111011" precede their 7-bit component data. Therefore, these two codes may be combined into one codeword representation of "11101x" as shown in FIG. 14. By determining the encoding tables according to this embodiment, storage conservation as well as processing efficiency can be achieved.

The fast forward scanning/parsing method of the embodiments captures the last fixed l components and variable k bits of residue data. The value l is used to adjust the joint weight computation accuracy. For example, in the application of N-gram models for sequence matching, a larger N corresponds to a larger l. The file fragment is then classified based on its last end sub-segment. Fragments belonging to the same class need only be compared once to other candidate fragments, thereby, eliminating redundant joint weight computations. For example, the scanning method above allows to reach the last sub-fragment of the row of current fragments in the graph. If a few of these sub-fragments are the same (e.g. the end point of these 5 fragments) for AC luminance and the code is 1111111111111110xxxxxxxxxx, there is no need to perform scanning and code verification by joining the candidate fragments to all 5 fragments. Scanning and code verification only need to be performed with 1 of the 5 current fragments. For the joint weight computation, only the first l components of the candidate fragments, i.e. the initial sub-segment of the candidate fragments, are used. The best-weight candidate fragment is then selected and the process is repeated for the remaining fragments.

Figure 17:
FIG. 17 shows the scanning of a header fragment to identify the end sub-segment according to an embodiment.

FIG. 17 shows the scanning of a header fragment to identify the end sub-segment according to an embodiment.

In FIG. 17, the header fragment is scanned forward to identify the end sub-segment, e.g. the final MCU (minimum coding unit) in the header fragment. After identifying the final MCU, the final full or partial MCU is extracted. The following operations are then performed: MCU component number tagging; MCU location tagging; quantization scaling factor tagging; observed range of number of components tagging; sampling factor tagging; total MCUs tagging; discarding of other fragment data; and header fragment classification based on left-over indicator, left-over bits, AC/DC indicator and Luminance/Chrominance indicator. The last MCU identifier data retrieval and tagging for the fragment are performed, and the fragment is classified based on last MCU identifier.

Figure 18:
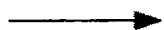
FIG. 18 shows the scanning of a file fragment to identify the end sub-segment and to perform joint validation check according to an embodiment.

FIG. 18 shows the scanning of a file fragment to identify the end sub-segment and to perform joint validation check according to an embodiment.

In FIG. 18, the file fragment is scanned forward to perform final MCU identification and extraction. The following operations are also performed: MCU component number tagging; MCU location tagging; observed range of number of components tagging; and fragment classification based on left-over indicator, left-over bits, AC/DC indicator and Luminance/Chrominance indicator.

The image file carving is performed by conducting compressed data based joint validation check. Based on the fragment classification, a one-time unique scan of candidate fragments is performed for similar tail headers or previous joined fragments, and redundant re-scan is removed. In addition, the method only scans from the final partial MCU, or scans with knowledge of the class and destination ID for the header or the previous jointed fragments in the joint validation test, and the redundant re-scan is removed. Anomalies (indicating a wrong joint) are detected based on code errors, quantization scaling factor, observed range of number of components, sampling factor and total MCUs.

The fast forward scanning for MCU identification and joint validation check in FIGS. 17 and 18 is performed by referring to the encoding tables (e.g. the tables in FIGS. 12, 14, 15, 16) constructed to optimize the code check efficiency. Other than optimizing the code check to allow the return of the pass or error results within two step processing, anomalies (indicating a wrong joint) are detected based on the quantization scaling factor (implying normal range of number of components), sampling factor and total MCUs. The carving process is further enhanced through the classification of the residual MCU bits and component type, so that only a onetime unique scan for similar tail is performed. The fragment is also tagged with information derived from the scan process to prevent a re-scan of the entire fragment during validation check.

FIG. 19 shows the scanning conducted on the header fragment in the event that the restart markers are provided.

FIG. 19(a) shows the scanning of a header fragment according to an embodiment. The header fragment is scanned forward to obtain restart count (marker-based), and is scanned backward to obtain the last segment of compressed bits in the header fragment. The method performs restart count scan and identifies last MCU by backward scan for restart marker. The last MCU identifier data retrieval and tagging for the fragment are performed, and the fragment is classified based on last MCU identifier.

FIG. 19(b) shows the scanning of the header fragment to identify the final MCU in the last segment. After identifying the final MCU, the following operations are performed: final full/partial MCU extraction; restart marker tagging; restart counts (total and fragment) tagging; MCU component number tagging; MCU location tagging; quantization scaling factor tagging; observed range of number of components tagging; sampling factor tagging; total MCUs tagging; discarding of other fragment data; and header fragment classification based on left-over indicator, left-over bits, AC/DC indicator and Luminance/Chrominance indicator.

FIG. 20 shows the scanning conducted on the file fragment in the event that the restart markers are provided.

In FIG. 20, the candidate file fragment is scanned forward to obtain the first/initial segment of compressed bits and restarted count (marker-based) in the candidate fragment, and is scanned backward to obtain the last segment of compressed bits. The following operations are then performed: both first and last segments extractions; restart marker tagging; restart count tagging; and discarding of other fragment data. For the last segment, the following operations are performed: final MCU identification and extraction, MCU component number tagging; MCU location tagging; observed range of number of components tagging; and fragment classification based on left-over indicator, left-over bits, AC/DC indicator and Luminance/Chrominance indicator.

The image file carving is performed by conducting compressed data based joint validation check, restart marker based joint validation check and final restart count validation check. Based on the fragment classification, a one-time unique scan of candidate fragments is performed for similar tail headers or previous joined fragments, and redundant re-scan is removed. In addition, the method only scans from the final partial MCU, or scans with knowledge of the class and destination ID for the header or the previous jointed fragments, and only scans till end of candidate fragments' first segment in the joint validation test. The redundant re-scan is removed. Anomalies (indicating a wrong joint) are detected based on code errors, restart marker errors, restart interval errors, quantization scaling factor, observed range of number of components, sampling factor and total MCUs.

The restart markers in the above embodiments are used for an additional level of error checking, and the joint validation check on the candidate fragments can be completed up to the first segment of the compressed bits.

The fast forward step-over carving method described in FIGS. 10-20 above is provided to detect fragment joints and perform deleted fragmented JPEG file recovery. Compared to existing methods, storage and processing are only required for the final MCUs and the tagged information, which also eliminate re-scanning of entire fragments. The optimized 2-step scanning includes byte based retrieval and scanning, fast length retrieval from tables directly, and stepping over to remove redundant detailed decoding. In addition, the method allows one-time unique scan of each class of candidate fragments instead of individual fragments. The fast forward step-over carving method allows in-depth and realistic scenarios without setting limitations on fragmentations, and provides customized validation for file carving without relying on generic file processors.

The fast forward step-over carving method is performed on the compressed data bits and therefore subsequent and more expensive decoding and checks can be reserved for constructed image files with higher success probability. The method of the embodiments bypasses the time and resource consuming JPEG decoding sequence (i.e. Huffman decoding, De-quantization, Inverse DCT, Up-sampling, and Inverse color transform procedures) to perform the checking, validation, partial data tagging, joint detection and carving at the raw compressed data level. By removing the workload and time to perform un-necessary processing in the subsequent stages for file fragment validation, a faster and thus more efficient detection and carving is achieved. The analysis results of the compression codeword structure (i.e. the encoding tables, e.g. as shown in FIGS. 12, 14, 15, 16) are also determined to reduce the amount of compressed data for validation and allow the validation check on the compressed data to be completed within two steps, thereby optimizing the step-over scanning to achieve a fast and efficient fragment joints detection and file recovery. With the fast forward step-over checking, validation and partial data tagging of the compressed data, the method is able to achieve low resource consumption, low overhead, and therefore is scalable to handle a high number of fragments.

The method according to the embodiments is also generic to be applied to all fragmented and deleted files at the compressed data level, without restrictions on the fragment size, the encoded file type, and assumptions on the image content (e.g. image must contain vertically or horizontally oriented lines) in the file.

The evaluation results according the method of various embodiment above are described in the following.

Figure 21:
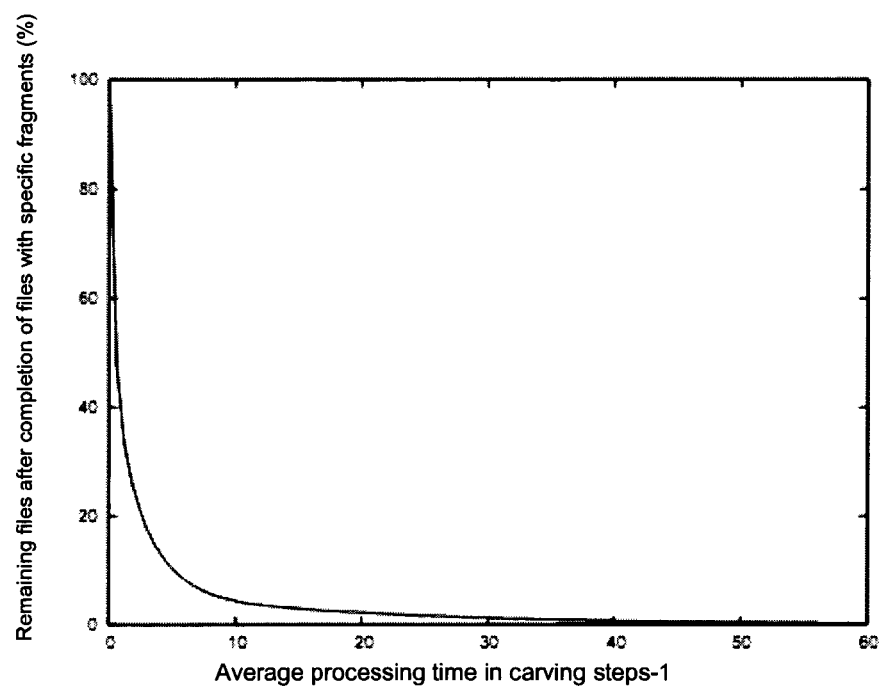
FIGS. 21 to 23 show the carving progress of FAT files, NTFS files and UFS files, respectively.
Figure 22:
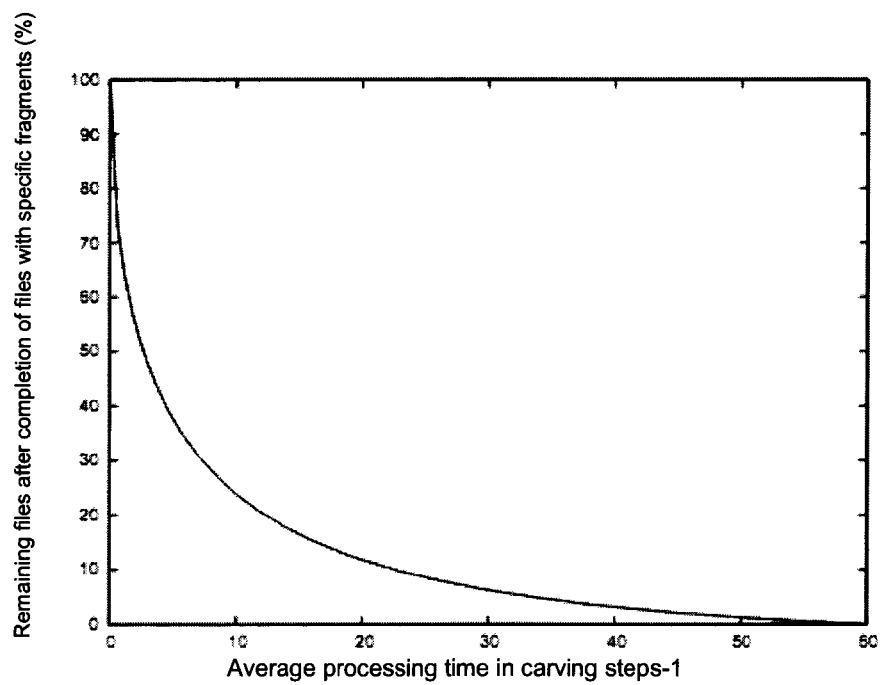
Figure 23:
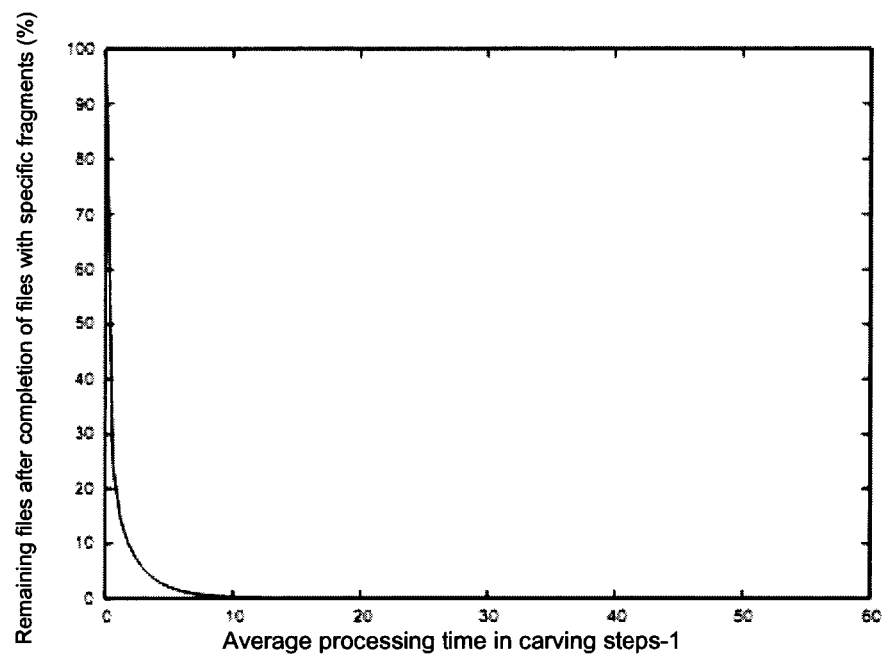

A study in "Garfinkel S., Carving contiguous and fragmented files with fast object validation, In Proceedings of the 2007 digital forensics research workshop, DFRWS, PA, August 2007" was conducted on over 300 hard drives acquired from the secondary market. The study indicated that most files contain a few number of fragments (e.g. 96.5% of the files in the most popular FAT file systems had between 2 to 20 fragments). Based on the data presented in the study, the performance of the progressive fragment joint carving method of various embodiments is evaluated, and the performance graphs are plotted based on the average percentage of uncompleted carved files as the time progresses for different file systems. The time unit is in terms of average carving steps. FIGS. 21 to 23 show the carving progress of FAT files, NTFS files and UFS files, respectively.

It is observed that a high percentage of the files (i.e. ≈90% are reconstructed in 5, 22 and 3 carving steps, for the FAT, NTFS and UFS file systems, respectively) are completely carved at the initial stages of the carving process.

Figure 24:
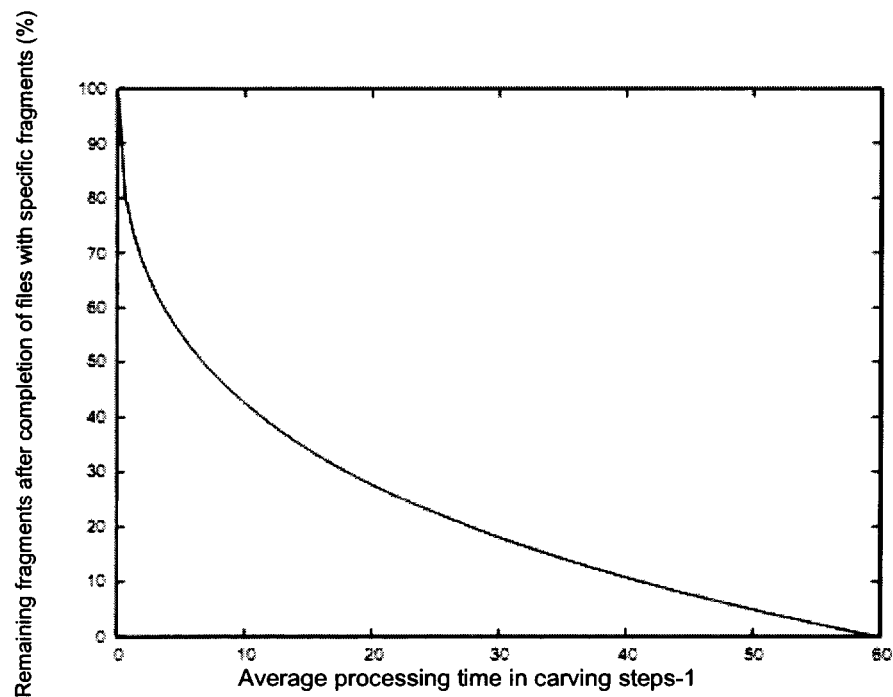
FIGS. 24 to 26 show the carving performance graphs based on the carving progress of FAT fragments, NTFS fragments and UFS fragments.
Figure 25:
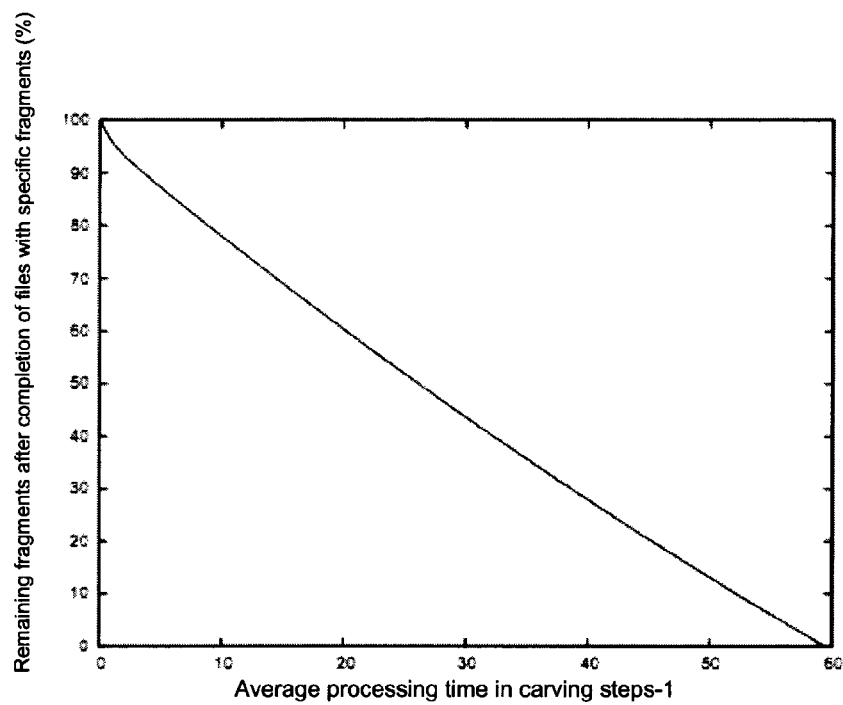
Figure 26:
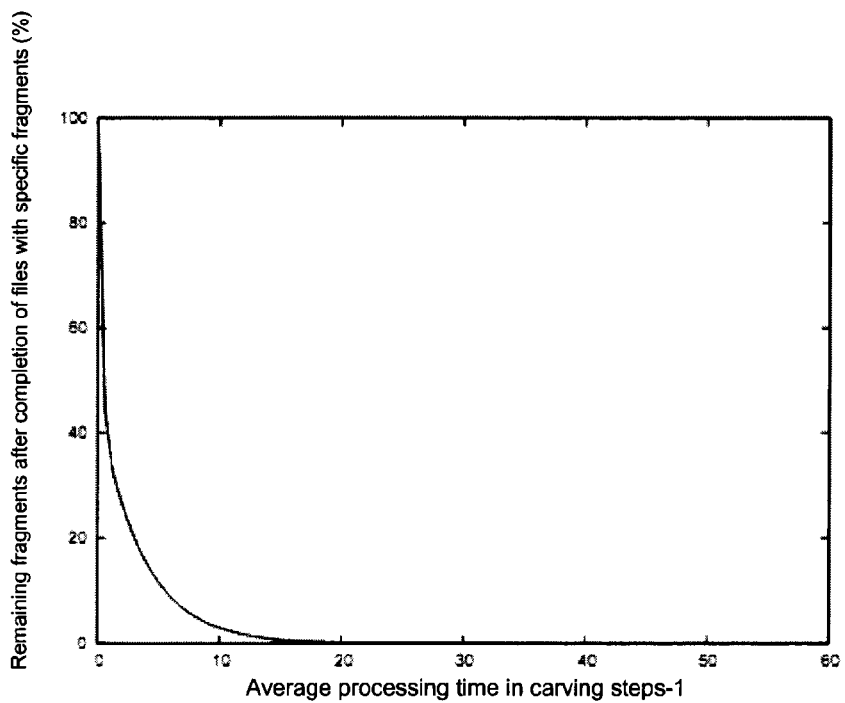

The carving performance graphs based on the carving progress of FAT fragments, NTFS fragments and UFS fragments are shown in FIGS. 24 to 26, respectively. As observed from the FIGS. 24 to 26, the fragments are reassembled at a fast rate in the progressive manner by the progressive joint carving method of the embodiment, which takes into consideration realistic fragmentation scenarios. After confirmation of fragment joints, the confirmed fragments are removed, resulting in significant conservations in the storage and computational requirements, as well as incurred overhead and carving time.

Compared to the existing graph theoretic carving methods, wherein all the weights are computed at the initial phase resulting in the computational complexity of $(n+h)(n+h-1)/2$ and sorting complexity of $O(n^2 \log n)$, the progressive joint carving method of the embodiments divides the computations into multiple levels, thereby eliminating redundant computations and sorting systematically. The storage is also reduced, as only the sorted lists of the weights of the remaining joints to the last confirmed fragment in the construction paths need to be stored. Therefore, it amounts to significant memory conservation. The storage requirement also decreases dynamically when the paths are completed as well as when the fragments are confirmed. Weight computations of the other fragments to the header fragments are not required. The number of computations of the joint weight also decreases as the paths are completed and the fragments are confirmed. In addition, weight computations of the footer fragments to the other remaining fragments are Rot required, resulting in a further reduction in terms of computational processing.

Figure 27:
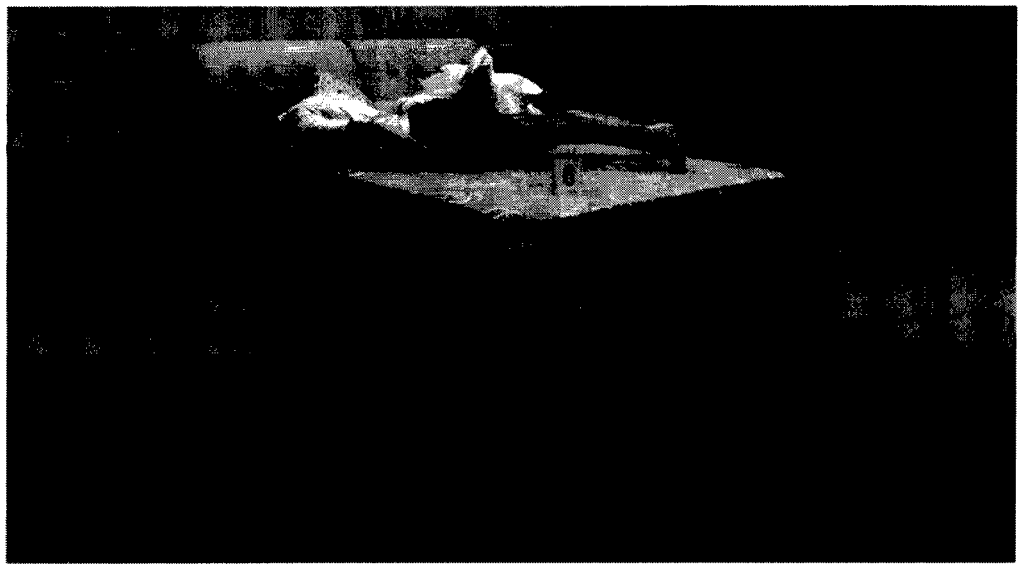
FIGS. 27 and 29 show the results of image evidence reconstruction and recovery by a commercial recovery system.
Figure 28:
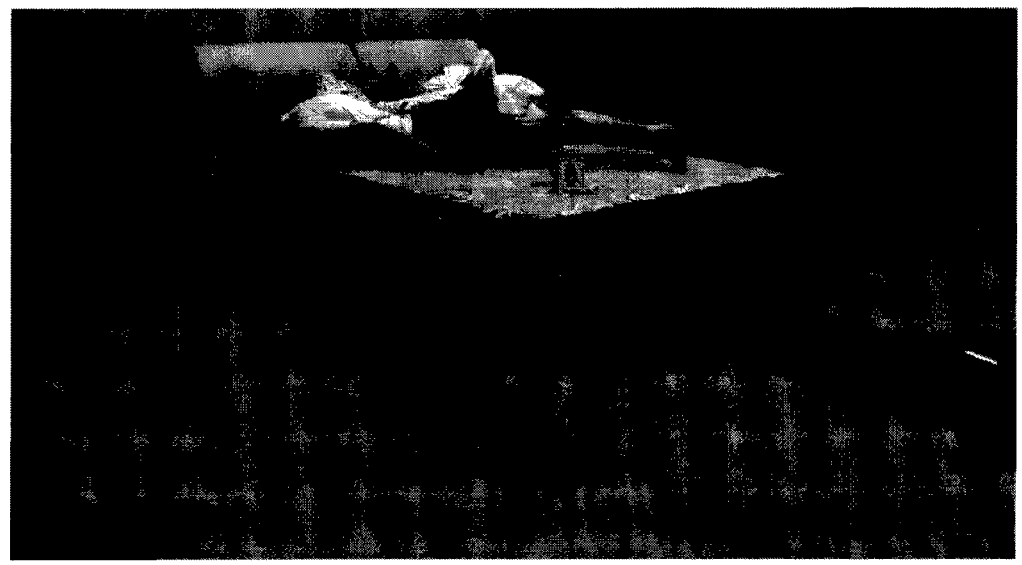
FIGS. 28 and 30 show the results of image evidence reconstruction and recovery by a system implementing the progressive joint carving method of the embodiments.
Figure 29:
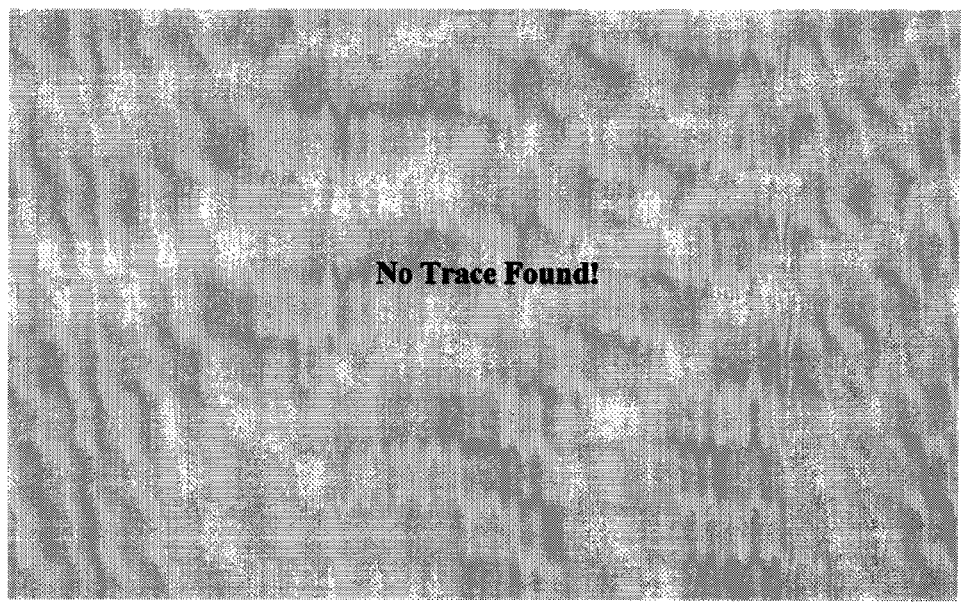
Figure 30:
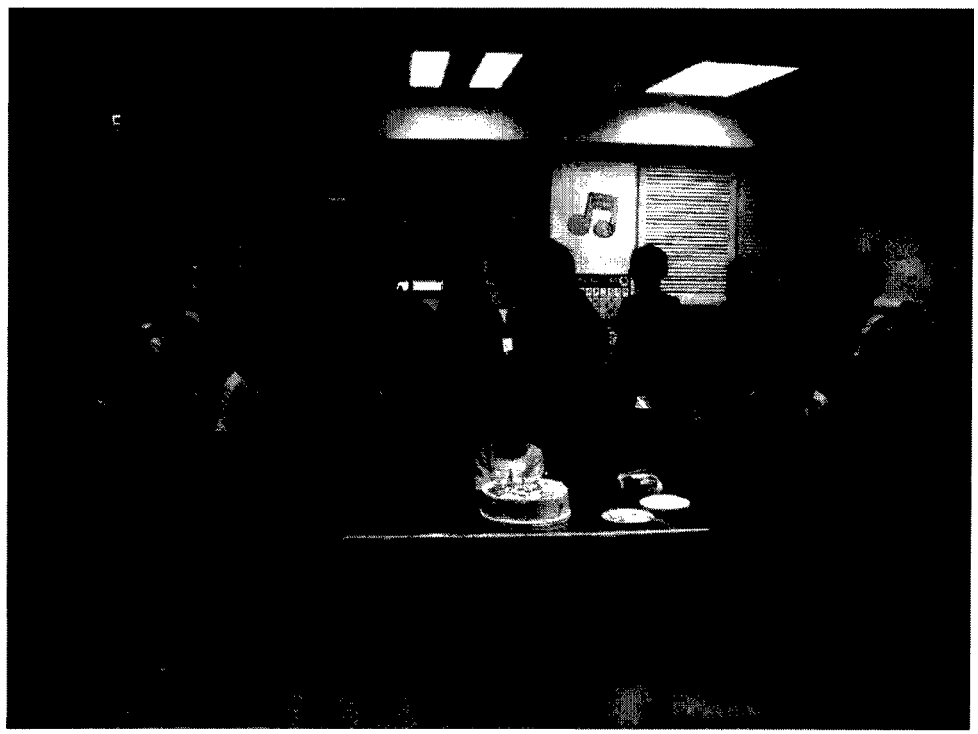

Experiments are conducted on reconstructing and recovering evidentiary JPEG image files from the acquired raw data using the progressive joint carving method of the embodiments, and the results are compared with the commercial recovery system utilizing the greedy heuristic algorithms. In the experiments, the method is to reconstruct and recover two fragmented photos (i.e. one of a mocked-up crime scene and one of a birthday party celebration) which were deleted. The crime scene image composed of 11 fragments, while the birthday party image composed of 128 fragments. FIGS. 27 and 29 show the results of the image evidence reconstruction and recovery by the commercial recovery system, and FIGS. 28 and 30 show the results of the image evidence reconstruction and recovery by the system implementing the progressive joint carving method of the embodiments.

In the experiments, the locations and sequence of the fragments were not restricted The same raw data was used as the input to both systems. It was observed that the carving system of the embodiments intrinsically handled all the acquired data without placing limitations and constraints on the fragmentation scenarios. It was therefore able to successfully uncover and reconstruct the files, in their entirety, from the deleted fragments according to the progressive joint carving method of the embodiments. The time taken to recover the Crime Scene Image and the Birthday Party Image, was 1 min 33 secs and 1 min 25 secs, respectively. The commercial recovery system, on the other hand, only partially recovered the crime scene image (in 2 mins 49 secs) as in FIG. 27, while no trace of the birthday party image could be found (after process completion taking 6 mins 23 secs) as in FIG. 29.

Fragmented file carving is important in the area of Digital Forensics to allow the law enforcement investigators to acquire evidence even in the event that they have been maliciously deleted by criminals. Advanced techniques to achieve efficient and accurate reconstruction and recovery of deleted evidence are necessary so as to prevent the loss of obscure evidence due to complex fragmentation scenarios (e.g. spread across different locations on large storage devices, out-of-sequence fragments).

The progressive joint carving method and the fast forward carving method according to various embodiments speed up the carving process without compromising on the search regions and fragmentation scenarios. The performance of the method is evaluated, which shows that a significant and high percentage of files is completely carved within a few carving steps.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for reassembling a data file from a starting file fragment and a plurality of file fragments stored on a digital storage device, the method comprising:

determining, from the plurality of file fragments, one or more matched file fragments which match the starting file fragment based on a first predetermined criterion;

associating the one or more matched file fragments with the starting file fragment;

determining one or more candidate data files based on the one or more matched file fragments;

checking if more than one file fragments have been determined to match the starting file fragment based on the first predetermined criterion;

selecting a candidate data file from the candidate data files determined for the matched file fragments as the reassembled data file based on a second predetermined criterion, if more than one matched file fragments have been determined to match the starting file fragment based on the first predetermined criterion;

wherein determining the matched file fragments comprises determining a weight for each file fragment and selecting one or more file fragments which match the starting fragment based on the weight of each file fragment, the weight representing a degree of matching between the file fragment and the starting file fragment; and modifying the weights of the matched file fragments based on the number of file fragments determined to match the starting file fragment, if more than one file fragments have been determined to match the starting file fragment; and determining a file fragment which matches the starting file fragment based on the modified weights and the weights of the remaining file fragments.

2. The method of claim 1, wherein determining one or more candidate data file based on the one or more matched file fragments comprises associating further matched file fragments with the one or more matched file fragments.

3. The method of claim 1, wherein selecting the reassembled data file from the candidate data files is based on the size of the candidate data files.

4. The method of claim 1, further comprising modifying the weights of the matched file fragments to be inversely proportional to the number of file fragments determined to match the starting file fragment.

5. The method of claim 1, wherein selecting the reassembled data file from the candidate data file comprises comparing the candidate data files according to the second predetermined criterion and selecting the reassembled data file based on the result of the comparison.

6. The method of claim 5, wherein selecting the reassembled data file from the candidate data files comprises comparing accumulated weights of the candidate data files.

7. A device for reassembling a data file from a starting file fragment and a plurality of file fragments stored on a digital storage device, the device comprising:

a processor; and a storage device storing instructions which, when executed by the processor, cause the processor to perform a method comprising:

determining, from the plurality of file fragments, one or more matched file fragments which match the starting file fragment based on a first predetermined criterion;

associating the one or more matched file fragments with the starting file fragment;

determining one or more candidate data files based on the one or more matched file fragments;

checking if more than one file fragments have been determined to match the starting file fragment based on the first predetermined criterion;

selecting a candidate data file from the candidate data files determined for the matched file fragments as the reassembled data file based on a second predetermined criterion, if more than one matched file fragments have been determined to match the starting file fragment based on the first predetermined criterion;

wherein determining the matched file fragments comprises determining a weight for each file fragment and selecting one or more file fragments which match the starting fragment based on the weight of each file fragment, the weight representing a degree of matching between the file fragment and the starting file fragment; and modifying the weights of the matched file fragments based on the number of file fragments determined to match the starting file fragment, if more than one file fragments have been determined to match the starting file fragment; and determining a file fragment which matches the starting file fragment based on the modified weights and the weights of the remaining file fragments.

8. A method for reassembling a data file from one or more starting file fragments and a plurality of file fragments stored on a digital storage device, the method comprising:

determining, from the plurality of file fragments, one or more matched file fragments which match a respective starting file fragment based on a weight representing a degree of matching between each file fragment and the respective starting file fragment;

checking whether the same file fragment is determined to match more than one starting file fragments and whether the weights between the same file fragment and the more than one starting file fragments are the same;

modifying the weights of the file fragment with respect to the more than one starting file fragments based on the number of the more than one starting file fragments, if the same file fragment has been determined to match more than one starting file fragments and the weights between the same file fragment and the more than one starting file fragments have been determined to be the same; and determining a file fragment to be associated with the respective starting file fragment based on the modified weights and the weights of the remaining file fragments.

9. The method of claim 8, further comprising:

modifying the weights of the file fragment with respect to the more than one starting file fragments to be inversely proportional to the number of the more than one starting file fragments.

10. The method of claim 8, further comprising:

checking whether more than one matched file fragments are determined for the respective starting file fragment;

modifying the weights of the more than one matched file fragments based on the number of matched file fragments determined for the respective starting file fragment, if more than one matched file fragments have been determined to match the respective starting file fragment.

11. The method of claim 10, further comprising:

modifying the weights of the matched file fragments to be inversely proportional to the number of matched file fragments for each starting file fragment.

12. A device for reassembling a data file from one or more starting file fragments and a plurality of file fragments stored on a digital storage device, the device comprising:

a processor; and a storage device storing instructions which, when executed by the processor, cause the processor to perform a method comprising:

determining, from the plurality of file fragments, one or more matched file fragments which match a respective starting file fragment based on a weight representing a degree of matching between each file fragment and the respective starting file fragment;

checking whether the same file fragment is determined to match more than one starting file fragments and whether the weights between the same file fragment and the more than one starting file fragments are the same;

modifying the weights of the file fragment with respect to the more than one starting file fragments based on the number of the more than one starting file fragments, if the same file fragment has been determined to match more than one starting file fragments and the weights between the same file fragment and the more than one starting file fragments have been determined to be the same; and determining a file fragment to be associated with the respective starting file fragment based on the modified weights and the weights of the remaining file fragments.

* * * * *